United States Patent
Sun

(10) Patent No.: US 9,317,306 B2
(45) Date of Patent: Apr. 19, 2016

(54) COMPUTER DEVICE AND MEMORY MANAGEMENT METHOD THEREOF

(71) Applicants: Inventec (Pudong) Technology Corporation, Shanghai (CN); INVENTEC CORPORATION, Taipei (TW)

(72) Inventor: Yu-Liang Sun, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 151 days.

(21) Appl. No.: 14/229,983

(22) Filed: Mar. 30, 2014

(65) Prior Publication Data

US 2015/0142908 A1    May 21, 2015

(30) Foreign Application Priority Data

Nov. 18, 2013    (CN) .......................... 2013 1 0576445

(51) Int. Cl.
*G06F 15/167*    (2006.01)
*G06F 9/455*    (2006.01)

(52) U.S. Cl.
CPC ............ *G06F 9/455* (2013.01); *G06F 9/45558* (2013.01); *G06F 2009/45583* (2013.01)

(58) Field of Classification Search
CPC ........................................................ H04L 43/08
USPC .................................................. 709/213, 217
See application file for complete search history.

(56) References Cited

U.S. PATENT DOCUMENTS

| | | | |
|---|---|---|---|
| 2011/0082962 A1* | 4/2011 | Horovitz | G06F 11/301 711/6 |
| 2013/0238775 A1* | 9/2013 | Taguchi | H04L 41/00 709/223 |

* cited by examiner

*Primary Examiner* — Adnan Mirza
(74) *Attorney, Agent, or Firm* — CKC & Partners Co., Ltd.

(57) ABSTRACT

A memory management method includes sharing a memory space of a memory component via a network through a host operating system, mounting the shared memory space via the network through a virtual machine, monitoring an memory utilization of a virtual memory of the virtual machine, and allocating a storage block to the virtual machine in a condition that the memory utilization of the virtual memory of the virtual machine is greater than an upper bound. As such, a capacity of the virtual memory of the virtual machine is increased.

8 Claims, 2 Drawing Sheets

COMPUTER DEVICE AND MEMORY MANAGEMENT METHOD THEREOF

RELATED APPLICATIONS

This application claims priority to Chinese Application Serial Number 201310576445.X, filed Nov. 18, 2013, which is herein incorporated by reference.

BACKGROUND

1. Field of Invention

The present invention relates to an electronic device and a management method thereof. More particularly, the present invention relates to a computer device and a memory management method thereof.

2. Description of Related Art

With advances in information technology, computer devices, such as personal computers and servers, are widely used in our daily lives.

A computer device may include a host operating system (OS) and at least a virtual machine. The host operating system is configured to manage physical resources of the computer device. The virtual machine can share parts of the physical resources of the computer device, and take the parts of the physical resources as virtual resources (e.g., virtual memory) of the virtual machine. The virtual machine manages the virtual resources by using a guest OS. With the virtual machine, applications of the computer device can be more flexible.

However, allocating the virtual resources is a complicated issue. In case the virtual machine shares the physical resources too much, the other applications of the computer device are crowded out. On the other hand, if the virtual machine shares the physical resources too little, the virtual machine is reduced in performance.

SUMMARY

Thus, to solve the problem above mentioned, one aspect of the invention is directed to a memory management method.

In accordance with one embodiment of the present disclosure, the memory management method is applied to a computer device. The computer device includes a memory component, a host operating system (OS), and a virtual machine. The memory management method includes sharing, through the host OS, a memory space of the memory component via a network; mounting, through the virtual machine, the shared memory space via the network; monitoring a memory utilization of a virtual memory of the virtual machine; and allocating a storage block of the memory space to the virtual machine in a condition that the memory utilization of the virtual memory of the virtual machine is greater than an upper bound, so as to increase a capacity of the virtual memory of the virtual machine.

Another aspect of the present disclosure is related to a computer device. In accordance with one embodiment of the present disclosure, the computer device includes a memory component, a host OS, and a virtual machine. The memory component includes a memory space. The host OS is configured for sharing the memory space via a network. The virtual machine is configured for mounting the shared memory space via the network, monitoring a memory utilization of a virtual memory of the virtual machine, and allocating a storage block of the memory space to the virtual machine itself in a condition that the memory utilization of the virtual memory of the virtual machine itself is greater than an upper bound, so as to increase a capacity of the virtual memory of the virtual machine itself.

Through an application of one embodiment described above, in the case that the memory utilization of the virtual memory of the virtual machine is greater than the upper bound, the computer device increases the capacity of the virtual memory of the virtual machine. Hence, the management of resources of the computer device can be more flexible.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
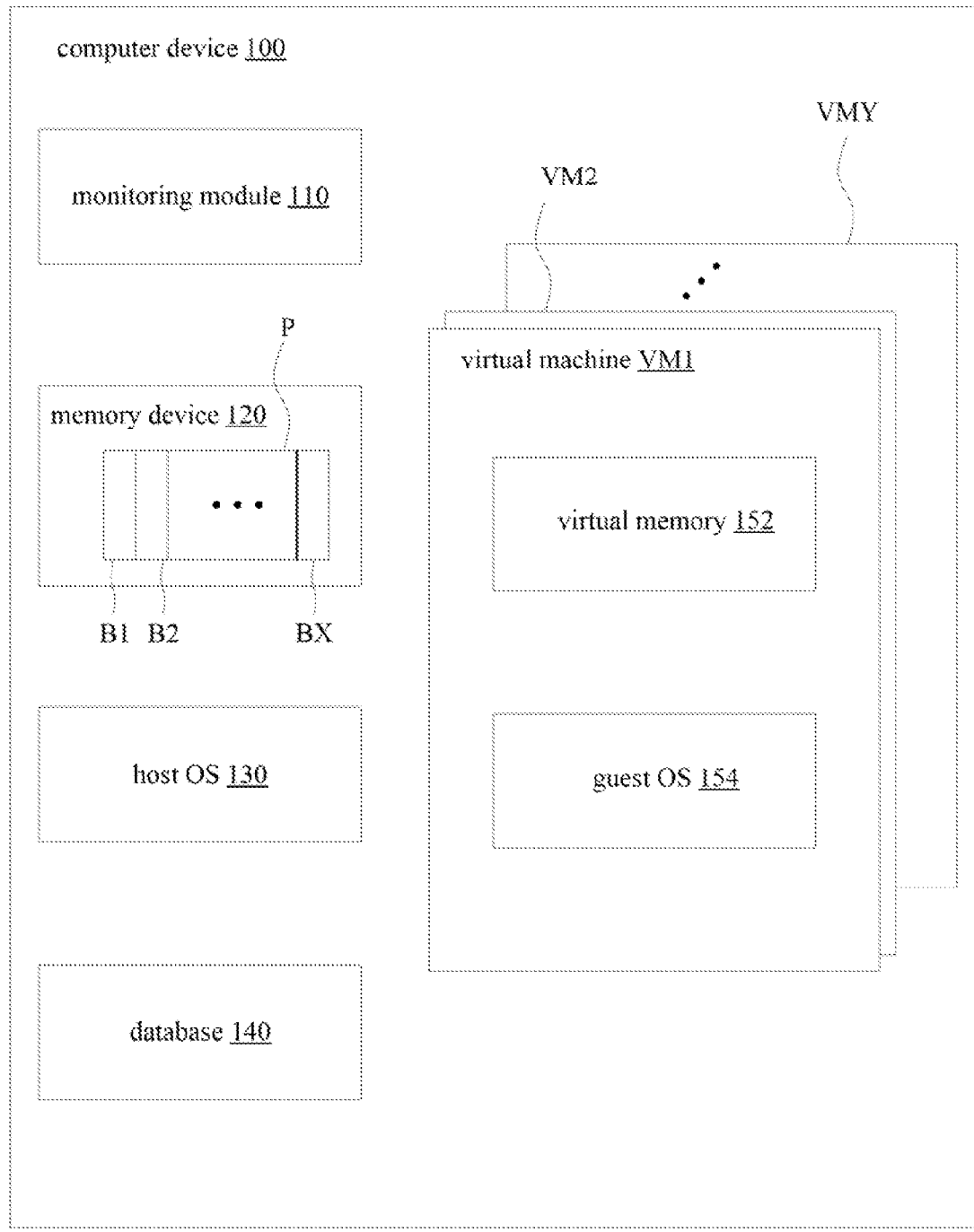
FIG. 1 is a schematic diagram of a computer device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, the meaning of "a," "an," and "the" includes reference to the plural unless the context clearly dictates otherwise.

It will be understood that, in the description herein and throughout the claims that follow, the terms "comprise" or "comprising," "include" or "including," "have" or "having," "contain" or "containing" and the like are to be understood to be open-ended, i.e., to mean including but not limited to.

It will be understood that all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One embodiment of the present invention is related to a computer device. FIG. 1 is a schematic diagram of a computer device 100 in accordance with one embodiment of the present disclosure.

In this embodiment, the computer device 100 includes a monitoring module 110, a memory component 120, a host operating system (OS) 130, a database 140, and virtual machines VM1, VM2, . . . , VMY, in which Y is an integer.

In this embodiment, the function of the monitoring module 110 is realized by, for example, a central processor, a microprocessor, or another suitable calculating device performing specific commands or a specific computer program. In one embodiment, the monitoring module 110 can be, for example, one or more process in the computer device 100.

In this embodiment, the host OS 130 is configured to manage hardware resources, such as a processor and a memory, in the computer device 100, and to utilize these hardware resources to execute processes of the computer device 100. In one embodiment, the host OS 130 is, for example, a Linux system, but the type of the host OS 130 is not limited to such a particular type of operating system.

In this embodiment, the database 140 is realized by, for example, a memory, a hard disk, a portable storage media, or another suitable storage component. In one embodiment, the database 140 is for example, a database which can be accessed via the Internet.

In this embodiment, the virtual machines VM1, VM2, . . . , VMY are, for example, established on a hypervisor (not shown) and implemented by using a processor. The virtual machines VM1, VM2, . . . , VMY access the hardware resources in the computer device 100 via the hypervisor. It is noted that although Y virtual machines VM1, VM2, . . . , VMY are taken as example in this embodiment, in practice, the quantity of the virtual machines can be varied on the basis of actual requirements, and the invention is not limited to this embodiment.

In this embodiment, each of the virtual machines VM1, VM2, . . . , VMY include a virtual memory 152 and a guest OS 154. In this embodiment, the virtual memories 152 are essentially physical memories in the computer device 100 allocated to the virtual machines VM1, VM2, . . . , VMY. The guest OSs 154 are configured to manage the virtual memories 152, and utilize the virtual memories 152 to make the processes of the virtual machines VM1, VM2, . . . , VMY be processed. In one embodiment, the guest OSs 154 are, for example, Linux systems, but the types of the virtual machines 154 are not limited to such a particular types of operating system.

The virtual memories 152 of the virtual machines VM1, VM2, . . . , VMY have default capacities determined when the virtual machines VM1, VM2, . . . , VMY are established. In an ideal condition, the default capacities of the virtual memories 152 are determined corresponding to the applications of the virtual machines VM1, VM2, . . . , VMY, so as to avoid too large of the default capacities of the virtual memories 152 causing other applications of the computer device 100 being crowded out, and avoid too less of the default capacities of the virtual memories 152 causing inefficiencies of the virtual machines VM1, VM2, . . . , VMY. However, in practice, since the memory utilizations of the virtual memories 152 are varied in a manner corresponding to the actual operating statuses of the virtual machines VM1, VM2, . . . , VMY, it is difficult to determine suitable default capacities of the virtual memories 152.

Thus, to solve such a problem, in this embodiment, the computer device 100 can selectively allocate additional physical memories to the virtual machines VM1, VM2, . . . , VMY according to present memory utilizations of the virtual memories 152, so as to dynamically increase the capacities of the virtual memories 152 of the virtual machines VM1, VM2, . . . , VMY.

In this embodiment, the memory component 120 includes a memory space P (e.g., a partition). In one embodiment, the host OS 130 establishes a RAM disk in the memory component 120 and establishes a partition in the RAM disk to serve as the memory space P. The memory space P includes storage blocks B1, B2, . . . , BX, in which X is an integer. It should be noted the quantity of the storage blocks B1, B2, . . . , BX described above is given for illustrative proposes, and other quantities of the storage blocks are within the contemplated scope of the present disclosure. In addition, the sizes of the storage blocks B1, B2, . . . , BX may be the same or different.

In this embodiment, the host OS 130 can make the memory space P in the memory component 120 be shared via the Internet through a sharing process.

The virtual machines VM1, VM2, . . . , VMY can mount the memory space P via the Internet through the guest OSs 154. Subsequently, the virtual machines VM1, VM2, . . . , VMY can monitor memory utilizations of the virtual memories 152 of themselves through the guest OSs 154. In a condition that the memory utilization of the virtual memory 152 of one of the virtual machines VM1, VM2, . . . , VMY is greater than an upper bound, this virtual machine can allocate one of the storage blocks B1, B2, . . . , BX of the memory space P to itself, so as to increase the capacity of the virtual memory 152 of itself.

For example, in a condition that the memory utilization of the virtual memory 152 of one of the virtual machines VM1, VM2, . . . , VMY is greater than an upper bound, this virtual machine establishes a file corresponding to one of the storage blocks B1, B2, . . . , BX through the guest OS 154 of itself. Subsequently, this virtual machine sets the file as a swap file of itself, so as to make the storage block corresponding to the file serve as the swap space of itself. In such a manner, the capacity of the virtual memory 152 of this virtual machine can be increased.

With such operation, in the case that the memory utilization of the virtual memory 152 of one of the virtual machines VM1, VM2, . . . , VMY is greater than the upper bound, the computer device 100 can increase the capacity of the virtual memory 152 of this virtual machine. Hence, the management of the resources of the computer device 100 can be more flexible.

In accordance of one embodiment of the present invention, each of the upper bounds is varied in a manner corresponding to an actual capacity of a corresponding virtual memory 152 itself related to (e.g., the actual capacity may be equal to the default capacity of the corresponding virtual memory 152+a capacity of the storage block set as the swap space of the virtual machine which including the corresponding virtual memories 152).

In addition, in one embodiment, the virtual machines VM1, VM2, . . . , VMY can set the corresponding storage blocks as the swap spaces with high priorities, so as to avoid storage spaces in a hard disk of the computer device 100 to be taken as the swap spaces of themselves.

Moreover, it is noted that each of the virtual machines VM1, VM2, . . . , VMY can set one or more of the storage blocks B1, B2, . . . , BX as the swapping space(s) of itself.

In one embodiment of the present invention, after one of the virtual machines VM1, VM2, . . . , VMY set a corresponding storage block as the swapping space of itself, this virtual machine can record a corresponding relationship between this virtual machine itself and the corresponding storage block into the database 140. In such a configuration, the computer device 100 can perform a management according to the corresponding relationship between this virtual machine and the corresponding storage block in the database 140.

In one embodiment of the present invention, to enable the computer device 100 to more flexibly adjust the capacities of the memories allocated to the virtual machines VM1, VM2, . . . , VMY, the virtual machines VM1, VM2, . . . , VMY can operatively cancel allocations of the storage blocks allocated to themselves.

In one embodiment, in a case that one of the virtual machines VM1, VM2, . . . , VMY has at least one of the storage blocks B1, B2, . . . , BX serving as the swap space of itself, when the memory utilization of the virtual memory 152 of this virtual machine is lower than a lower bound, this virtual machine can cancel the allocation of the storage block allocated to itself, so as to decrease the capacity of the virtual memory 152 of itself.

For example, in a case that the memory utilization of the virtual memory 152 of one of the virtual machines VM1, VM2, . . . , VMY is smaller than a lower bound, this virtual machine can cancel a configuration, in which a corresponding file is set as the swap file of this virtual machine, according to a relationship between this virtual machine and a storage block allocated thereto, and delete this corresponding file, so as to cancel the allocation of the storage block allocated to itself. Subsequently, this virtual machine deletes the relationship between itself and the storage block which is no longer allocated to this virtual machine through the guest OS 154 of this virtual machine via network. In such a manner, the storage blocks allocated to this virtual machine can be decreased, so as to avoid other applications of the computer device 100 to be crowded out.

In one embodiment of the present invention, each of the lower bounds is varied in a manner corresponding to an actual capacity of a corresponding virtual memory 152 itself related to (e.g., the actual capacity may be equal to the default capacity of the corresponding virtual memory 152+a capacity of the storage block set as the swap space of the virtual machine which including the corresponding virtual memories 152).

In addition, in one embodiment the monitoring module 110 can monitor the virtual machines VM1, VM2, . . . , VMY to determine whether the virtual machines VM1, VM2, . . . , VMY fail. In a condition that one of the virtual machines VM1, VM2, . . . , VMY fails, the monitoring module 110 can cancel the allocations of all of the storage blocks allocated to this virtual machine according to the relationships, which are between this virtual machine and all the storage blocks allocated thereto, and subsequently delete all of the relationships.

For example, in one embodiment, the monitoring module 110 can transmit network packets to the virtual machines VM1, VM2, . . . , VMY by using a network command "ping", and determine whether the virtual machines VM1, VM2, . . . , VMY fail according to whether the virtual machines VM1, VM2, . . . , VMY response the network packets.

In a condition that one of the virtual machines VM1, VM2, . . . , VMY fails, if this virtual machine have a corresponding storage block serving as the swap space of itself, the monitoring module 110 can cancel a configuration of the file, which corresponds to this corresponding storage block, set as the swap file of this virtual machine, and delete the file, so as to cancel the configuration of the corresponding storage block set as the swap space of this virtual machine. Next, the monitoring module 110 can delete the relationship between the corresponding storage block and this virtual machine recorded in the database 140.

Through such an operation, occupation of all of the storage blocks allocated to this virtual machine during this virtual machine fails can be avoided, so as to avoid other applications of the computer device 100 to be crowded out.

To better explain the invention, an operative embodiment containing specific details is provided in the following paragraphs. However, the invention is not limited to the operative embodiment below.

In this operative embodiment, in a condition that the virtual machine VM1 has no storage block serving as the swap space thereof, when the memory utilization of the virtual memory 152 of the virtual machine VM1 is greater than an upper bound (e.g., the upper bound is equal to 80% of the default capacity of the virtual memory 152), the virtual machine VM1 establishes a file corresponding to the storage block B2, and sets the file as the swap file of the virtual machine VM1, so as to make the storage block B2 serve as the swap space of the virtual machine VM1. Through such an operation, the capacity of the virtual memory 152 of the virtual machine VM1 can be increased.

After the storage block B2 is set as the swap space of the virtual machine VM1, the virtual machine VM1 records a relationship between the virtual machine VM1 and the storage block B2 into the database.

In addition, after the storage block B2 is set as the swap space of the virtual machine VM1, the upper bound and lower bound corresponding to the virtual machine VM1 is increased in a manner along with the actual capacity of the virtual memory 152. For example, the upper bound is increased from 80% of the default capacity of the virtual memory 152 to 80% of a summation of the default capacity of the virtual memory 152 and the capacity of the storage B2. The lower bound is increased from 10% of the default capacity of the virtual memory 152 to 10% of a summation of the default capacity of the virtual memory 152 and the capacity of the storage B2.

At this time, if the memory utilization of the virtual memory 152 of the virtual machine VM1 is greater than the increased upper bound, the virtual machine VM1 can set another storage block to serve as the swap space thereof.

In addition, at this time, if the memory utilization of the virtual memory 152 of the virtual machine VM1 is smaller than the increased lower bound, the virtual machine VM1 cancels the configuration of the file, which corresponds to the storage block B2, set as the swap file of the virtual machine VM1 according to the relationship between the virtual machine VM1 and the storage block B2 recorded in the database 140, and delete the file corresponding to the storage block B2, so as to cancel the configuration of the storage block B2 set as the swap space of the virtual machine VM1. Subsequently, the virtual machine VM1 deletes the relationship between the virtual machine VM1 and the storage block B2 recorded in the database 140.

In such a manner, the storage blocks allocated to this virtual machine can be decreased, so as to avoid other applications of the computer device 100 to be crowded out.

It should be noted that, after the configuration of the storage block B2 set as the swap space of the virtual machine is canceled, the upper bound and lower bound corresponding to the virtual machine VM1 is decreased in a manner along with the actual capacity of the virtual memory 152. For example, the upper bound is decreased from 80% of a summation of the default capacity of the virtual memory 152 and the capacity of the storage B2 to 80% of the default capacity of the virtual memory 152. The lower bound is decreased from 10% of a summation of the default capacity of the virtual memory 152 and the capacity of the storage B2 to 10% of the default capacity of the virtual memory 152.

Moreover, in a condition that the virtual machine VM1 has the storage blocks B1, B2 serving as the swap space thereof, the database 140 records the relationships between the virtual machine VM1 and the storage blocks B1, B2. When the monitoring module 110 finds that the virtual machine VM1 fails, the monitoring module 110 cancels the configurations of the files, which correspond to the storage blocks B1, B2, set as the swap file of the virtual machine according to the relationships recorded in the database 140, and deletes the files, so as to cancel the configurations of the storage blocks B1, B2 set as the swap spaces of the virtual machine VM1.

Subsequently, the monitoring module 110 can delete the relationships between the virtual machine VM1 and the storage blocks B1, B2 recorded in the database 140. Through such an operation, occupation of the storage blocks B1, B2 during the virtual machine VM1 fails can be avoided, so as to avoid other applications of the computer device 100 to be crowded out.

Another aspect of the invention is related to a memory management method of a computer device. In the following paragraphs, details of the invention are provided with reference to the memory management method.

The memory management method can be applied to a computer device having a structure that is the same as or similar to the structure shown in FIG. 1. To simplify the description below, in the following paragraphs, the embodiment shown in FIG. 1 will be used as an example to describe the memory management method according to an embodiment of the present disclosure. However, the invention is not limited to application to the embodiment shown in FIG. 1.

In addition, it should be noted that, in the steps of the following memory management method, no particular sequence is required unless otherwise specified. Moreover, the following steps also may be performed simultaneously or the execution times thereof may at least partially overlap.

Figure 2:
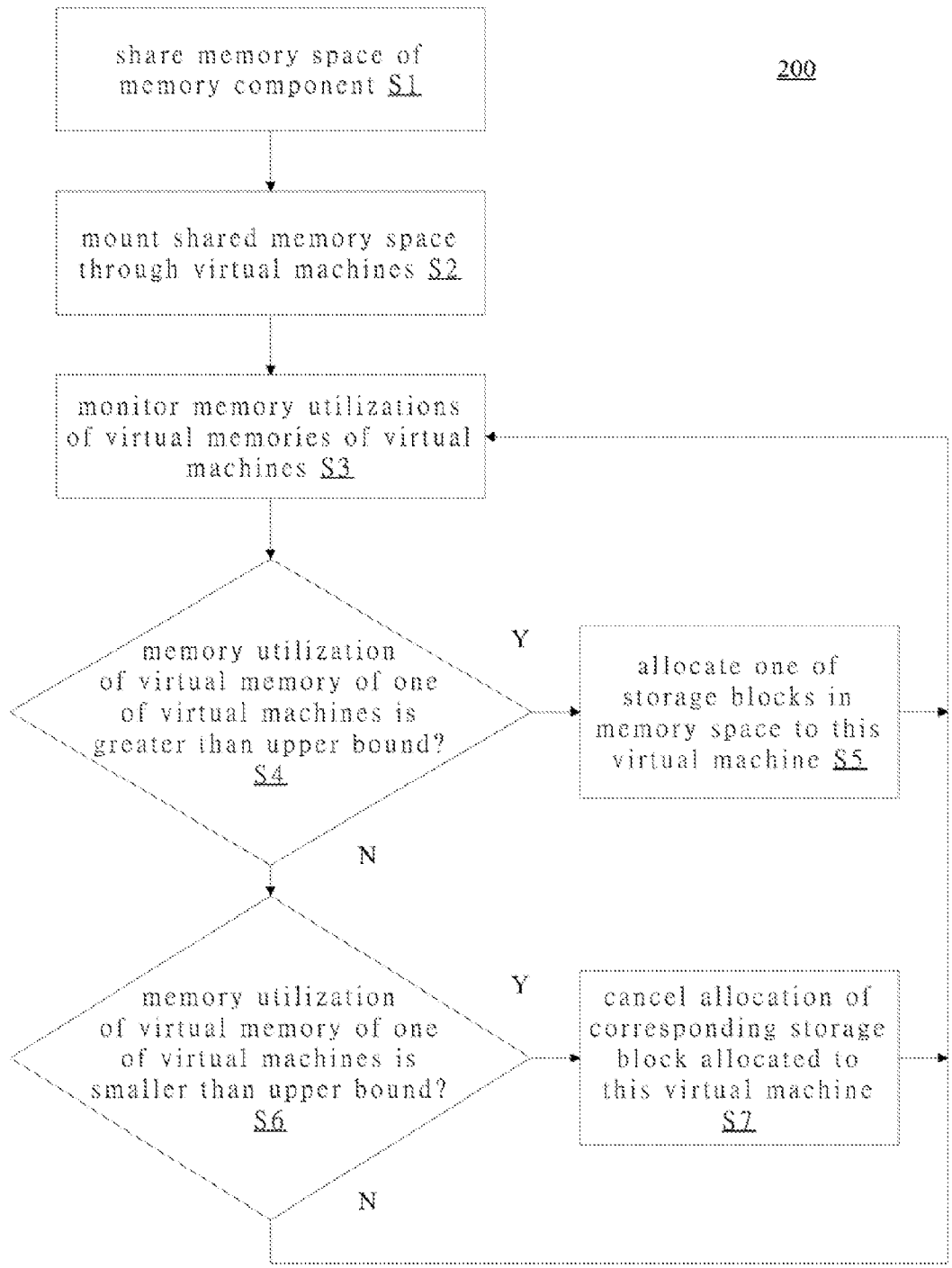
FIG. 2 is a flowchart of a memory management method in accordance with one embodiment of the present disclosure.

FIG. 2 is a flowchart of a memory management method 200 in accordance with one embodiment of the present disclosure. The memory management method 200 includes the steps below.

In step S1, the memory space P of the memory component 120 is shared through the host OS 130 via the network. In one embodiment, the memory space P is established by, for example, establishing a RAM memory in the memory component 120 and establishing a partition in the RAM memory through the host OS 130.

In step S2, the shared memory space P is mounted through the guest OSs 154 of the virtual machines VM1, VM2, ..., VMY via the network.

In step S3, memory utilizations of the virtual memories 152 of the virtual machines VM1, VM2, ..., VMY are monitored through the guest OSs 154 of the virtual machines VM1, VM2, ..., VMY.

In step S4, whether the memory utilization of the virtual memory 152 of one of the virtual machines VM1, VM2, ..., VMY is greater than an upper bound is determined through the guest OSs 154 of the virtual machines VM1, VM2, ..., VMY. If so, step S5 is performed. If not, step S6 is performed. It should be noted that each of the upper bounds is varied in a manner corresponding to an actual capacity of a corresponding virtual memory 152 itself related to (e.g., the actual capacity may be equal to the default capacity of the corresponding virtual memory 152+a capacity of the storage block set as the swap space of the virtual machine which including the corresponding virtual memories 152).

In step S5, in a condition that the memory utilization of the virtual memory 152 of one of the virtual machines VM1, VM2, ..., VMY is greater than the upper bound, one of the storage blocks B1, B2, ..., BX in the memory space P is allocated to this virtual machine through the guest OS 154 of this virtual machine, so as to increase the capacity of the virtual memory 154 of this virtual machine. Subsequently, a relationship between this virtual machine and the storage block allocated thereto is recorded into the database 140 through the guest OS of this virtual machine.

In step S6, in a condition that all the memory utilizations of the virtual memories 152 of the virtual machines VM1, VM2, ..., VMY are not greater than the upper bounds, whether the memory utilization of the virtual memory 152 of one of the virtual machines VM1, VM2, ..., VMY is smaller than an lower bound is determined through the guest OSs 154 of the virtual machines VM1, VM2, ..., VMY. If so, step S7 is performed. If not, the routine returns back to step S3.

It should be noted that each of the lower bounds is varied in a manner corresponding to an actual capacity of a corresponding virtual memory 152 itself related to (e.g., the actual capacity may be equal to the default capacity of the corresponding virtual memory 152+a capacity of the storage block set as the swap space of the virtual machine which including the corresponding virtual memories 152).

In step S7, in a condition that the memory utilization of the virtual memory 152 of one of the virtual machines VM1, VM2, ..., VMY is smaller than the lower bound, the allocation of the corresponding storage block allocated to this virtual machine is canceled through the guest OS 154 of this virtual machine according to the relationship recorded in the database 140, so as to decrease the capacity of the virtual memory of this virtual machine. Subsequently, the relationship between this virtual machine and the corresponding storage block recorded in the database 140 is deleted through the guest OS 154 of this virtual machine.

It should be noted that, in step S7, if this virtual machine has no storage block serving as the swap space thereof, no operation is performed in step S7, and the routine returns back to step S3.

Also noted that details of steps S1-S7 can be ascertained by referring to the previous aspect of the invention, and a description in this regard will not be repeated herein.

With such operations, in the case that the memory utilization of the virtual memory of one of the virtual machine VM1, VM2, ..., VMY is greater than the upper bound or smaller than the lower bound, the computer device 100 can increases or decrease the capacity of the virtual memory 152 of this virtual machine. Hence, the management of the resources of the computer device 100 can be more flexible.

In addition, the computer device 100 can monitor the virtual machines VM1, VM2, ..., VMY to determine whether the virtual machines VM1, VM2, ..., VMY fail. In a condition that the monitoring module 110 finds that one of the virtual machines VM1, VM2, ..., VMY fails, the monitoring module 110 can cancel the allocations of all of the storage blocks allocated to this virtual machine according to the relationships, which are between this virtual machine and all the storage blocks allocated thereto, recorded in the database 140, and subsequently delete all of the relationships.

Through such an operation, occupation of the all of the storage blocks allocated to this virtual machine during this virtual machine fails can be avoided, so as to avoid other applications of the computer device 100 to be crowded out.

It should be noted that, details of such a monitoring operation can be ascertained by referring to the previous aspect, and a description in this regards is not repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A memory management method applied to a computer device, the computer device comprising a memory component, a host operating system (OS), a monitoring module and a virtual machine, with a guest operating system (OS), the memory management method comprising:
sharing, through the host OS, a memory space of the memory component via a network;
mounting, through the virtual machine, the shared memory space via the network;
monitoring through the guest OS, a memory utilization of a virtual memory of the virtual machine;

allocating a storage block of the memory space to the virtual machine in a condition that the memory utilization of the virtual memory of the virtual machine is greater than an upper bound, so as to increase a capacity of the virtual memory of the virtual machine;

recording a relationship between the storage block and the virtual machine into a database;

monitoring, through the monitoring module, the virtual machine to determine whether the virtual machine fails;

cancelling the allocation of the storage block allocated to the virtual machine according to the relationship in a condition that the virtual machine fails; and deleting the relationship between the storage block and the virtual machine in the database.

2. The memory management method as claimed in claim 1, wherein the step of allocating the storage block of the memory space to the virtual machine comprises:

establishing a file corresponding to the storage block; and setting the file as a swap file of the virtual machine, so as to make the storage block become a swap space of the virtual machine.

3. The memory management method as claimed in claim 1 further comprising:

cancelling the allocation of the storage block allocated to the virtual machine in a condition that the memory utilization of the virtual memory of the virtual machine is smaller than a lower bound.

4. The memory management method as claimed in claim 3, wherein the step of cancelling the allocation of the storage block allocated to the virtual machine comprises:

cancelling a configuration of a file being the swap file of the virtual machine; and deleting the file corresponding to the storage block.

5. A computer device comprising:

a memory component comprising a memory space;

a monitoring module;

a host OS configured for sharing the memory space via a network; and a virtual machine with a guest operating system (OS), wherein the virtual machine configured for:

mounting the shared memory space via the network;

monitoring, through the guest operating system (OS), a memory utilization of a virtual memory of the virtual machine;

allocating a storage block of the memory space to the virtual machine itself in a condition that the memory utilization of the virtual memory of the virtual machine itself is greater than an upper bound, so as to increase a capacity of the virtual memory of the virtual machine itself; and recording a relationship between the storage block and the virtual machine into a database, and wherein the monitoring module configured for;

monitoring the virtual machine to determine whether the virtual machine fails;

cancelling the allocation of the storage block allocated to the virtual machine according to the relationship in a condition that the virtual machine fails; and deleting the relationship between the storage block and the virtual machine in the database.

6. The computer device as claimed in claim 5, wherein the virtual machine is further configured for:

establishing a file corresponding to the storage block; and setting the file as a swap file of the virtual machine, so as to make the storage block become a swap space of the virtual machine.

7. The computer device as claimed in claim 5, wherein the virtual machine is further configured for:

cancelling the allocation of the storage block allocated to the virtual machine in a condition that the memory utilization of the virtual memory of the virtual machine is smaller than a lower bound.

8. The computer device as claimed in claim 7, wherein the virtual machine is further configured for:

cancelling a configuration of the file being the swap file of the virtual machine; and deleting the file corresponding to the storage block.

* * * * *